United States Patent [19]

Odaka et al.

[11] Patent Number: 4,562,578

[45] Date of Patent: Dec. 31, 1985

[54] METHOD FOR DATA TRANSMISSION

[75] Inventors: Kentaro Odaka, Kanagawa; Yoichiro Sako; Yuichi Kojima, both of Tokyo; Kenji Nakano; Hisayoshi Moriwaki, both of Kanagawa, all of Japan

[73] Assignee: Sony Corporation, Tokyo, Japan

[21] Appl. No.: 494,325

[22] Filed: May 13, 1983

[30] Foreign Application Priority Data

May 15, 1982 [JP] Japan ................... 57-82660

[51] Int. Cl.$^4$ ........................... G06F 11/10
[52] U.S. Cl. ........................ 371/40; 371/39
[58] Field of Search ............. 371/38, 39, 40; 360/38.1, 32, 40; 358/336, 314

[56] References Cited

U.S. PATENT DOCUMENTS

| | | | |
|---|---|---|---|
| 4,211,997 | 7/1980 | Rudnick et al. | 371/40 |
| 4,281,355 | 7/1981 | Wada et al. | 371/40 |
| 4,398,292 | 8/1983 | Doi et al. | 371/39 |
| 4,400,810 | 8/1983 | Ive | 371/40 |
| 4,414,666 | 11/1983 | Nelson | 371/39 |
| 4,467,373 | 8/1984 | Taylor et al. | 371/40 |

Primary Examiner—Michael R. Fleming

Attorney, Agent, or Firm—Lewis H. Eslinger; Alvin Sinderbrand

[57] ABSTRACT

In the recording/reproducing of digital audio signals, errors are detected and corrected by using two parity words, one arranged at the center of the block formed of data words and the arranged at one end of the block. The probability that uncorrectable error will be present in the center of the block is relatively high, so placing the parity word there prevents loss of the more valuable data. Maximum correctable burst errors are determined by the length of the block, so placing the other parity word on the end of the block lengthens it and improves burst error correction. The parity words are arranged as indicated before adding a cyclic redundancy check (CRC) code to the data signal and then modulation coding the signal before recording. During playback, the reproduced signal is demodulated and the CRC code used to detect errors for which error pointers are generated. The reproduced data is read into memories in accordance with generated addresses and the pointers prevent the writing in of words found to be in error, which error words are subsequently corrected if possible using parity codes originally encoded into the signals prior to recording.

23 Claims, 11 Drawing Figures

FIG. 5

| | Sync | Q1 | Q2 | ... | Q43 | Q44 | Q45 | Q46 | ... | Q87 | Q88 | Q89 | Q90 | ... | Q131 | |
|---|---|---|---|---|---|---|---|---|---|---|---|---|---|---|---|---|
| Q | Address | | | | | | | | | | | | | | | |
| W0 | Q0 | ID1 | L0 | | R60 | ID2 | ID3 | L1 | | R61 | ID4 | ID5 | L2 | | R62 | |
| W1 | L63 | R63 | | | R126 | L64 | R64 | | | R127 | L65 | R65 | | | R128 | |
| W2 | L129 | | | | R192 | L130 | | | | R193 | L131 | | | | R194 | |
| W3 | L195 | | | | R258 | L196 | | | | R259 | L197 | | | | R260 | |
| P | P0 | | | | P43 | P44 | | | | P87 | P88 | | | | P131 | |
| W4 | L261 | | | | R324 | L262 | | | | R325 | L263 | | | | R326 | |
| W5 | L327 | | | | R390 | L328 | | | | R391 | L329 | | | | R392 | |
| W6 | L393 | | | | R456 | L394 | | | | R457 | L395 | | | | R458 | |
| W7 | L459 | | | | R522 | L460 | | | | R523 | L461 | | | | R524 | |
| | CRC CODE | | | | | | | | | | | | | | | |

← 44 → ← 44 → ← 44 →

← 132 BLOCKS →

| SY | AD | Q0 | ID0 | L63 | L129 | L195 | P0 | L261 | L327 | L393 | L459 | CRC CODE |

FIG. 9

| | Sync | Address | | 52 | | 1 | | 52 | | | | 52 | |
|---|---|---|---|---|---|---|---|---|---|---|---|---|---|
| Q | | Q0 | ---- | Q51 | Q156 | Q52 | ---- | Q103 | Q104 | ---- | Q155 | | |
| W0 | | ID0 | ---- | R72 | L75 | ID2 | ---- | R73 | ID4 | ---- | R74 | | |
| W1 | | R75 | ---- | L151 | R153 | R76 | ---- | L152 | R77 | ---- | L153 | | |
| W2 | | L154 | ---- | R229 | L232 | L155 | ---- | R230 | L156 | ---- | R231 | | |
| W3 | | R232 | ---- | L308 | R310 | R233 | ---- | L309 | R234 | ---- | L310 | | |
| P | | P0 | ---- | P51 | P156 | P52 | ---- | P103 | P104 | ---- | P155 | | |
| W4 | | L311 | ---- | R386 | L389 | L312 | ---- | R387 | L313 | ---- | R388 | | |
| W5 | | R389 | ---- | L465 | R467 | R390 | ---- | L466 | R391 | ---- | L467 | | |
| W6 | | L468 | ---- | R543 | L546 | L469 | ---- | R544 | L470 | ---- | R545 | | |
| W7 | | R546 | ---- | L622 | R624 | R547 | ---- | L623 | R548 | ---- | L624 | | |
| | CRC. CODE | | | | | | | | | | | | |

157 BLOCKS

F I G.10
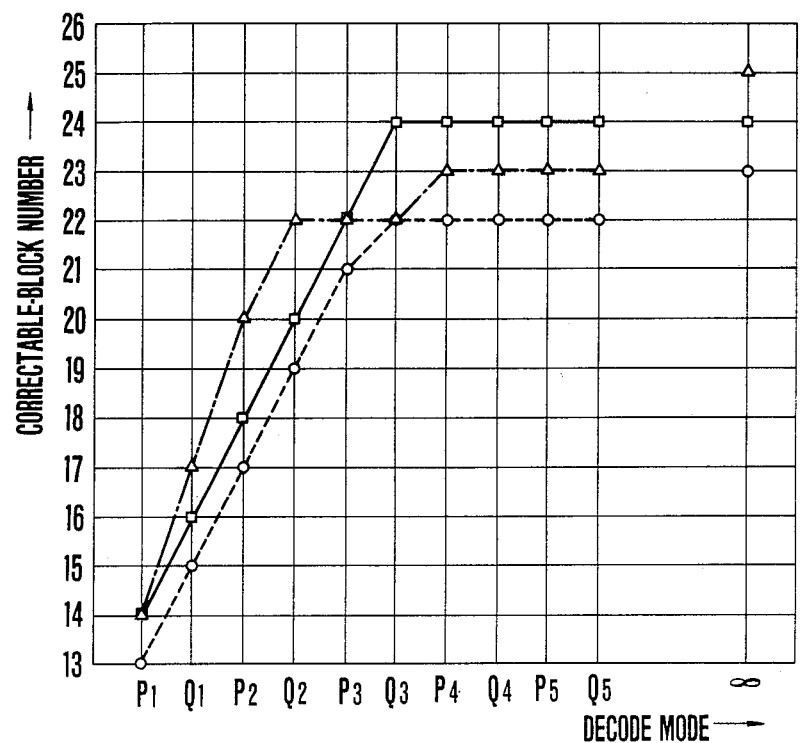
F I G.11
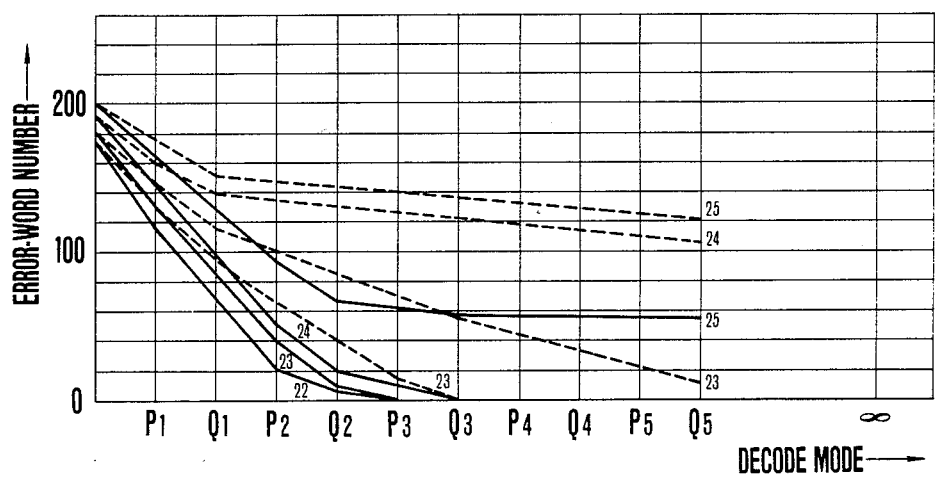

METHOD FOR DATA TRANSMISSION

BACKGROUND OF THE INVENTION

1. Field of the Invention

The present invention relates generally to digital data transmission and, specifically, to a method and apparatus for correcting errors in digital audio signals.

2. Description of the Prior Art

It is known to use the so-called cross-interleave technique to provide a correctable error code for digital data transmission. This technique involves delaying the various words making up the digital data series by different predetermined amounts, thereby time interleaving the data, and then transmitting the time interleaved data. The interleaved data is received and each word appropriately delayed by different corresponding times in an inverse pattern, based upon the original delays to reconstitute or reassemble the digital data in its original form.

It is the usual practice when using the cross-interleave technique to use modulo 2 adders to generate two parity series, each representing the data words in two different arrangements. Because each word of the digital data signal will be contained in these two parity series, it can be seen that this known cross-interleave technique provides an error correcting capability that is quite high. Nevertheless, when multiple words containing errors are transmitted, the cross-interleave technique is not sufficiently powerful and the errors cannot be corrected.

OBJECTS AND SUMMARY OF THE INVENTION

Accordingly, it is an object of the present invention to provide a method and apparatus for error correction coding that can correct multiple errors occurring in a digital information signal.

It is another object of the present invention to provide a method and apparatus to maximize the length of a burst error that can be corrected.

It is a further object of the present invention to provide improved error correction by generating two parity series, one being arranged at the center of a data block and one being arranged at an end of the data block.

According to one aspect of the present invention, data transmission apparatus is provided in which a complete cross-interleave error correction system positions one parity word at the center of the block to the corrected, where the probability is high that error correction might be impossible, while another parity word is positioned at the end of the block, in order to lengthen the block and to maximize the burst error that can be corrected.

A digital data signal recording/reproducing system according to the present invention uses two random access memories (RAMs), a block of the data signal being read into one RAM while the preceding block is read out of another RAM, the data signal is used to generate two parity series to be used for error checking and correction, with one parity series arranged at the center of each block and the other arranged at an end of each block. A cyclic redundancy check code is added to each block containing the two parity series before the signal is modulated for recording. Upon reproduction of the recorded signal, the cyclic redundancy check code is used to identify error words and error pointers are raised to prevent such error words from being written into the random access memories. The two parity series are then used to try to correct the errors and a final error correction operation, different than the previous one, is performed before the reproduced digital data signal is output from the system.

The above, and other objects, features, and advantages of the present invention will be apparent from the following detailed description of an illustrative embodiment that is to be read in conjunction with the accompanying drawings, in which like reference numerals identify the corresponding elements and parts in the several views.

BRIEF DESCRIPTION OF THE DRAWINGS

FIG. 5 is a chart showing the arrangement of words making up a message for error correction according to the present invention;

FIG. 9 is a chart showing the arrangement of words making up a message for error correction according to the present invention;

FIG. 10 is a graph showing the relationship between words in a coded digital signal according to the present invention; and FIG. 11 is a graph showing the error correcting capability of the present invention.

DETAILED DESCRIPTION OF PREFERRED EMBODIMENTS

Figure 1:
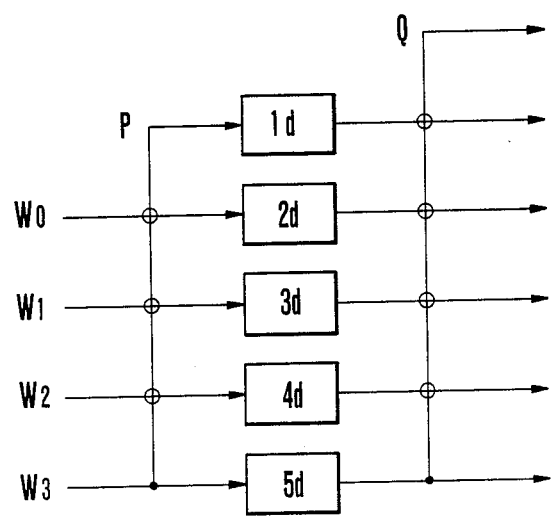
FIG. 1 is a block diagram representation of a prior art error correcting system.

The cross-interleave technique is known as one method to place a digital data signal into an error correctable code structure, and FIG. 1 shows a known construction suitable to perform cross-interleave error correction, in which $W_0$, $W_1$, $W_2$, and $W_3$ each represent an audio data series. When four words contained in the respective audio data series are applied to modulo 2 adders, represented typically in FIG. 1 by a circle, a first parity data series P is generated. This data series P is fed to several delay circuits, each of which provides a different time delay, represented as d, $2d$, $3d$, $4d$, and $5d$ in FIG. 1, where d represents one unit of delay time. The result of applying first parity data series P to the several delay units of different time delay amounts is to rearrange the data series, $W_0$ to $W_3$, from a first arrangement state into a second arrangement state. The five words derived, respectively, from the data series arranged in this second arrangement state are then added in a second set of modulo 2 adders, each being indicated typically in FIG. 1 by a circle, thereby generating a second parity data series Q.

Figure 2:
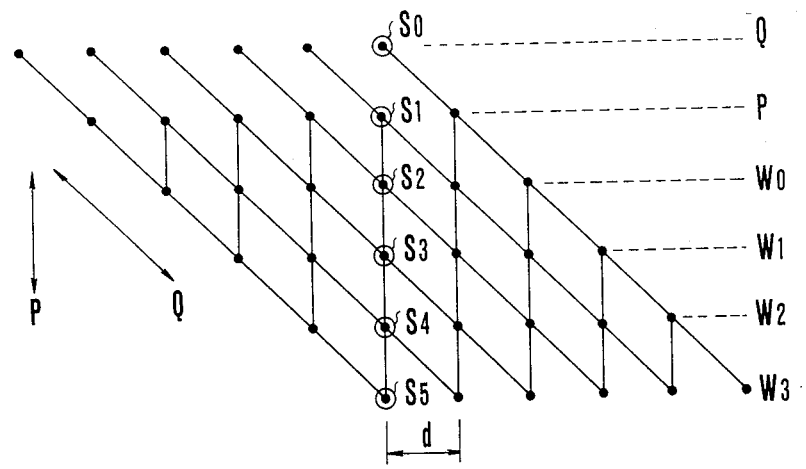
FIG. 2 is a diagrammatic representation of error correction coding provided by the system of FIG. 1.

Because the cross-interleave technique has the feature that each word of the digital audio signal is contained in the two parity data series, P and Q, this technique is high in error correcting capabilities. Nevertheless, in using this cross-interleave error correction coding method, when there are four words in error in one block the probability that error correction is impossible must be considered. For example, in using the cross-interleave technique where four words of digital data are added with two parity words, the parity series formed thereby can be represented as in FIG. 2, in which the solid circles typically represent one word of a code symbol. In FIG. 2, the five words in the longitudinal or vertical direction represent one parity series P, and the six words in the diagonal direction represent the other parity series Q. The specific words $S_0$ through $S_5$, are represented typically as open circles having solid circular centers.

Assuming that the data transmission is random, and assuming that in a decoder P-decode will be accomplished using the parity P and Q-decode will be accomplished using the parity Q and that such decoding will be alternately repeated a number of times, the extent to which error correction for each of the specific words, $S_0$ to $S_5$, is impossible may be seen. For example, in the case of the symbol $S_0$, when four symbols including the symbol $S_0$ are arranged in a trapezoidal relationship on the data field, as represented in FIG. 2, and contain errors at the same time, the error words of two words will be respectively contained in both of the two parity series and, hence, such error cannot be corrected. If the number of such trapezoidal patterns is counted, the probability that error correction will be impossible can be determined. In regard to the other symbols, $S_1$ to $S_5$, when four words including these symbols are arranged forming a parallelogram and are simultaneously erroneous, error correction is again seen to be impossible when using the cross-interleave technique.

If the probability that one word is erroneous is taken as $P_s$, then the probability that error correction will be impossible at every word of $S_0$ to $S_5$ is given as follows:

$P_0 = 10\ P_s^4$ $P_1 = 10\ P_s^4$ $P_2 = 13\ P_s^4$ $P_3 = 14\ P_s^4$ $P_4 = 13\ P_s^4$ $P_5 = 10\ P_s^4$

There will occur, of course, the case where more than five words are simultaneously erroneous and in that case error correction will also be impossible, however, the probability in such situation (less than $Ps^5$) is neglected. Further, and not being limited to four words, generally in the case of n words-two parity, the similar tendency is considered.

In the known error correcting coding methods, the probability that error correction is impossible is dependent upon whether the data channels are different, so that where such probability is low, the parity data is allocated to the position of $S_0$, $S_1$, or $S_5$. Nevertheless, since the information data is much more important than the parity data being used for error correction, it is desirable that the data, which in the case of audio signals may be pulse code modulation (PCM) data, be located at a position where the probability that error correction will become impossible is quite low, that is, it should be at a location where it can be assumed that most errors can be corrected.

Figure 3:
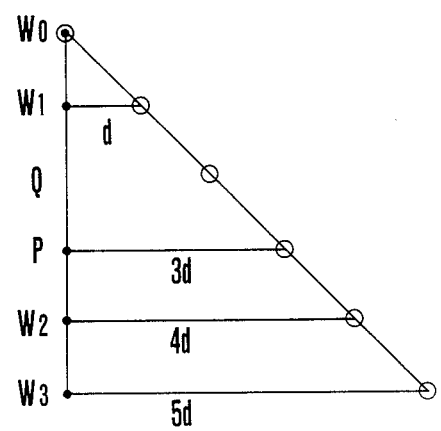
FIG. 3 is a diagrammatic representation of error correction coding according to the system of FIG. 1.

FIG. 3 shows the relationship among the various data points, in which the audio data series $W_0$ and $W_1$ are located at positions corresponding to symbols $S_0$ and $S_1$, respectively; the parity data series Q and P are located at positions corresponding to symbols $S_2$ and $S_3$, respectively; and the parity data series $W_2$ and $W_3$ are located at the positions corresponding to symbols $S_4$ and $S_5$, respectively. In FIG. 3, the five words represented by the solid circles generate the parity word P, while the six words represented by the open circles generate the parity word Q. As may be seen in FIG. 3, in the series generating the parity word P there is a blank appearing at the location corresponding to parity word Q, and this blank poses a problem in the case of the complete cross-interleave error correcting technique.

Figure 4:
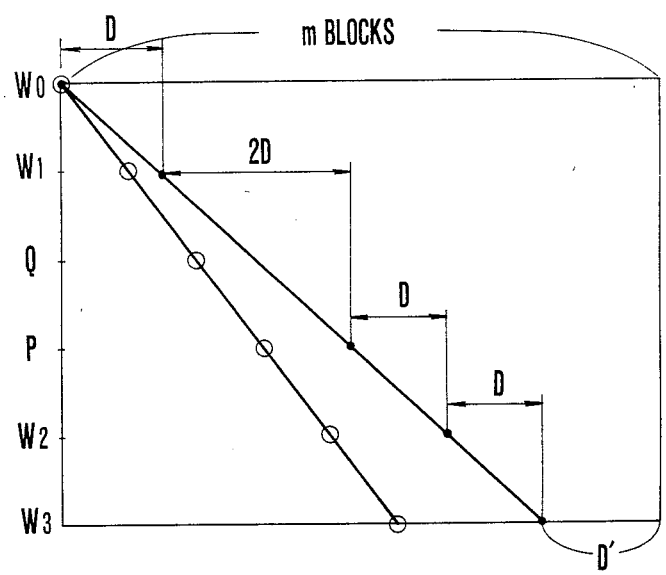
FIG. 4 is a diagrammatic representation of error correction coding according to the present invention.

In the complete cross-interleave technique, the interleaving is completed with a unit formed of a predetermined number of words of PCM data. Referring to FIG. 4, in a situation similar to that described above in which there are four symbols and two parity words, the data is written in a memory having a matrix structure of four symbols by m blocks. As shown in FIG. 4, the four words represented by solid circles are read out to form the parity word P, which is written in the memory, and then the five words represented by open circles are read out to form the parity word Q. The generation of the parity word P is completed by four symbols times m blocks, and the generation of the parity word Q is completed by five symbols times m blocks. The synchronizing signal, the block address signal, and the cyclic redundancy check code (CRC) for error detection are added to every block and then recorded.

In this kind of complete cross-interleave error correction, it is desirable that a large distance D (block) exist between two words contained in the series for generating the parity symbol P, because the length of a burst error that is correctable by the parity symmbol P is defined by this distance D (block). Furthermore, it is necessary that the number of remaining blocks, represented by the distance D' (block) in FIG. 4, be less than the distance D (block). This distance D (block) is the distance between every two words that are the closest to each other, which are contained in the series for generating the parity P. As will be clear from FIG. 4, if the parity symbol Q is positioned at the center of one block, the distance between words $W_1$ and P becomes 2D (block), thereby presenting the problem that the distance D (block) between two symbols cannot be increased.

In view of this problematical situation, the present invention provides data transmission method and apparatus of the complete cross-interleave kind, in which one parity symbol P is positioned at the center of the block, where the probability is high that if an error occurs there it will be impossible to correct, and in which the other parity symbol Q is positioned at the end of the block, in order to lengthen the block and thereby to maximize the burst error length that can be corrected.

In the following example, the present invention is applied to the situation in which a stereophonic audio signal, related to the video signal of the NTSC system, is digitized and recorded on magnetic tape by a rotary head in a manner now generally well-known.

Referring to FIG. 5, the arrangement of one data unit is represented in which one word consists of eight bits, specifically, $n=8$ words, $m=132$ blocks, and $n \times m = 1056$ words. The digital audio signal of one field in the NTSC system is 1050 words, so that when sampling frequency is $2F_h$ (where $F_h$ is the horizontal frequency) a control data of six words ($ID_0, \ldots ID_5$) must be added to the words in the field. In other words, control data consisting of six words are added to the digital audio signal in one field, which is sequential as follows: $L_0, R_0, L_1, R_1, R_2, \ldots L_{522}, L_{523}$ and $R_{523}$, at the beginning thereof.

Of this control data, $ID_0$ is a marker word and $ID_1$ to $ID_4$ are time codes, in which $ID_1$ represents an hour, $ID_2$ represents a minute, $ID_3$ represents a second, and $ID_4$ represents a field. Word $ID_5$ includes eight bits, $a_0$ to $a_7$, which comprise the following information: bit $a_0$ represents whether the control data is effective; bits $a_1$ and $a_2$ represent the specific kind of digital audio signal (monaural, stereo, bilingual, etc.); bit $a_3$ represents discrimination between audio information and information for another display relating to one channel; bit $a_4$ represents a similar discrimination relating to the other channel; bits $a_5$ and $a_6$ represent start and stop information and these bits are set to a high level at the start and stop of the recording; and bit $a_7$ represents information related to avoiding damping.

Furthermore, the 1056 words that include the control data $ID_0$ to $ID_5$ are arranged such that they have a distance of 44 blocks in the lateral direction at every two words, that is, two-by-two, such as $ID_0$-$ID_1$, $ID_2$-$ID_3$, $ID_4$-$ID_5$, and so on. In a hardware implementation, this corresponds to writing at addresses separated by 44 blocks, as controlled by the address control of a random access memory (RAM). If the control data or parity data are separated, then two words, Li and Ri, are arranged in the lateral direction, or left to right direction in relation to FIG. 5. The reason the digital audio signal is interleaved by being divided into three in the lateral direction is that the burst error length which is correctable is thereby maximized, when using, for example, mean-value interpolation. More particularly, by such lateral arrangement of Li and Ri, the correcting length can be made longer in comparison to the case where they are arranged in the longitudinal direction, or the up and down direction in relation to FIG. 5.

Figures 6, 7:
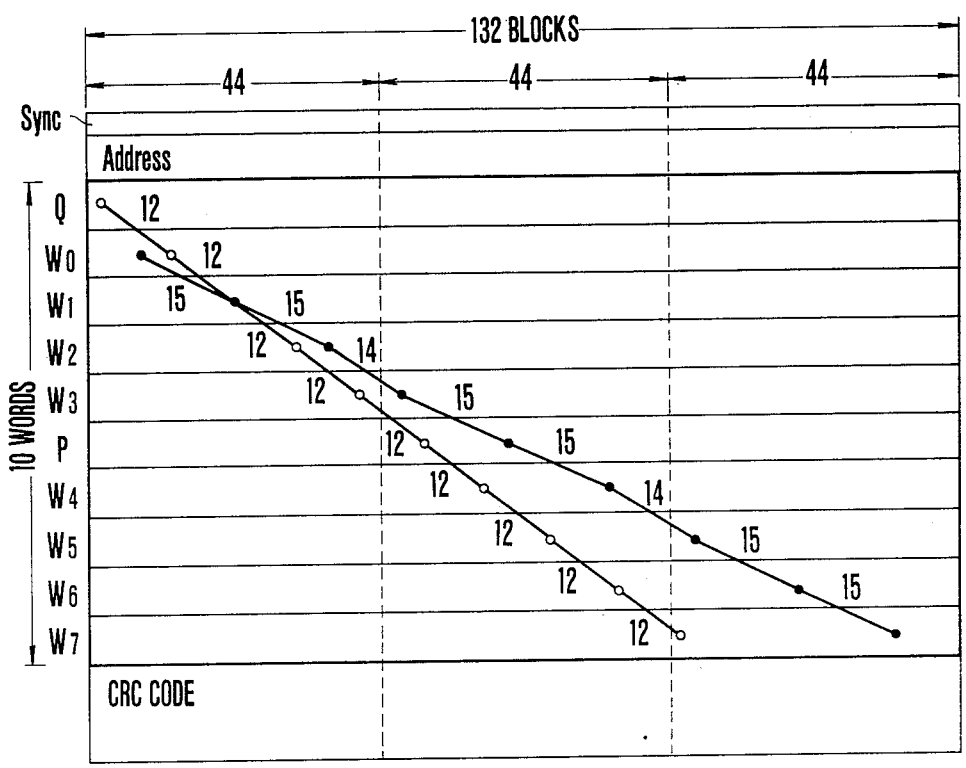
FIG. 6 is a diagrammatic representation of the relationship between words in a coded message according to the present invention.
FIG. 7 is a representation of a coded message according to the present invention.

Two parities, either odd or even, are added to the digital audio signal of one field that includes the control data. Referring then to FIG. 6, if the audio data series in each row of the above matrix structure is taken as $W_0$, $W_1, \ldots W_7$, the first parity series P having eight words in each data series is formed with a distance of 14 blocks or 15 blocks in the lateral direction, and the words contained in this parity series P are represented typically by solid circles.

If it were possible all distances between the two symbols of the first parity series P would be selected as fourteen blocks, however, since the distance D' at one portion may be as long as twenty blocks, then six blocks must be taken therefrom and used to form a distance of fifteen blocks between symbols at six different positions, thereby further enhancing the burst error correcting capability. Moreover, nine words, each of which are taken from the audio data series $W_0$ to $W_7$ and the parity series P, form the second parity series Q with a distance of twelve blocks, and the words contained in the parity series Q are represented typically by open circles in FIG. 6. The distance in blocks between the elements of two parity series is chosen to be divisible by two or three. The first parity series P is positioned at the center of one block, while the second parity series Q is positioned at the end of one block. In other words, as described hereinabove, since the probability is high that errors occuring in data at the center of the block will be impossible to correct, the present invention teaches to locate the parity series P at the center of the block, since it is less important than the audio data, and further teaches to locate the parity series Q at the end of one block in order to maximize the distance between two words that form the parity series P.

Each group of 132 blocks includes an eight-word digital audio signal, the two-word parity data, and the CRC code for error detection, which may involve 16 bits added to the data of each block. The block synchronizing signal and block address signal are also added to the group of blocks before it is recorded on magnetic tape. If the data of the first block is taken out of context and examined separately, it will appear as shown in FIG. 7, it being understood that after this block there will follow the second block, the third block, ... up to the 132d block, moving left to right in FIG. 5.

Figure 8:
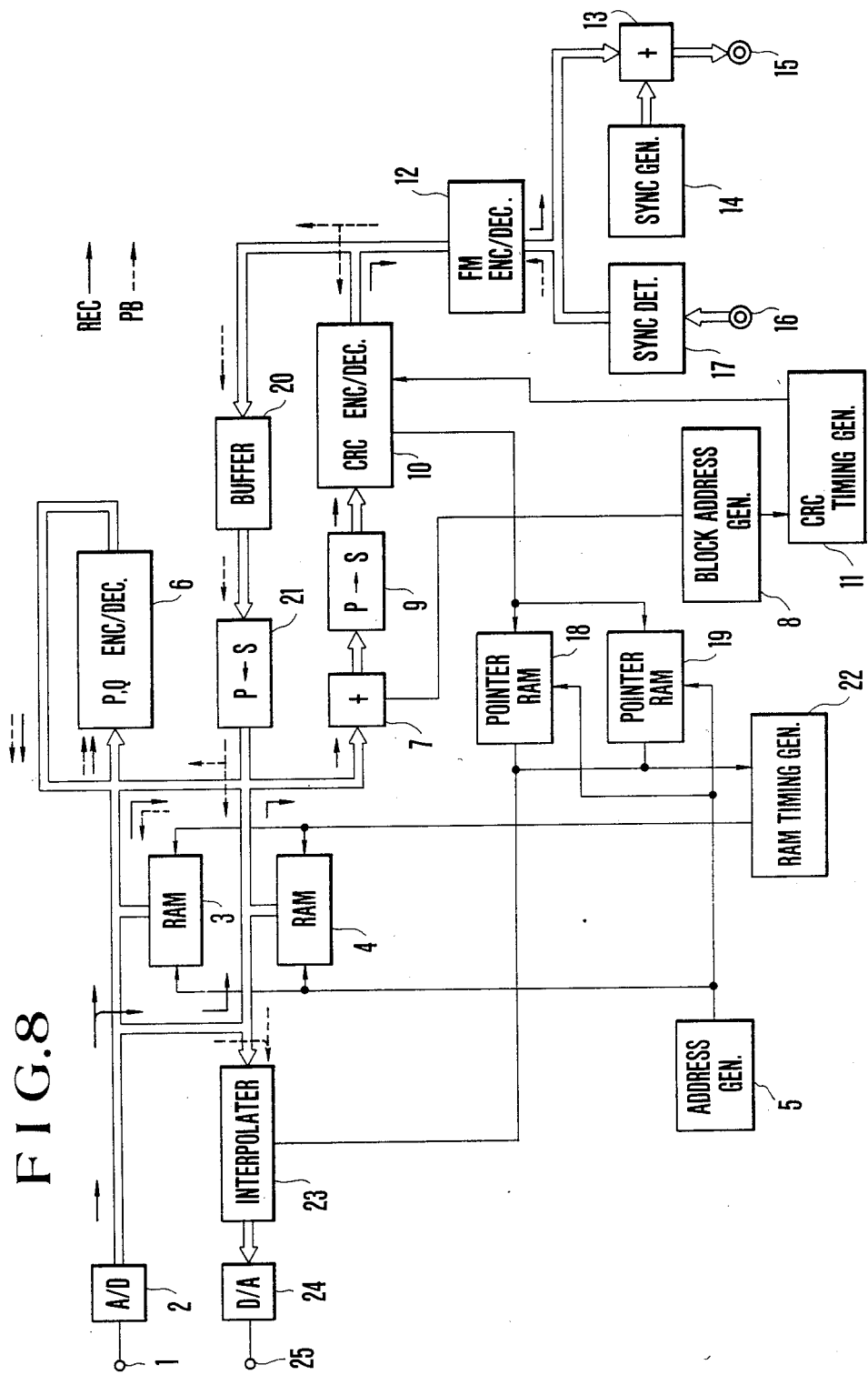
FIG. 8 is a block diagram of an embodiment of a data transmission system providing error correction according to the present invention.

FIG. 8 is a block diagram of a digital data transmission system employing an embodiment of the present invention, in which the solid line arrows show the direction of signal flow during the transmitting or recording mode, and the broken line arrows show the direction of signal flow during the receiving or playback or reproduction mode. In FIG. 8, input terminal 1 is supplied with an audio signal to be recorded, which is digitized in analog-to-digital converter (A/D)2, and the digitized audio signal from A/D converter 2 is written into either random access memory (RAM)3 or random access memory (RAM) 4. Both random access memories 3 and 4 have sufficient capacity to contain the entire digital audio signal comprising one field. During the time that the audio input data is being written into one or the other of random access memories 3 or 4, the data of the previous field is being read out from the other corresponding random access memory and is fed to a P, Q encoder/decoder 6, which generates the two parities to be written back into the other RAM. The data are written into predetermined areas of RAMs 3 and 4, respectively, as shown in FIGS. 5 and 6, and, in order to read out this data in the interleaved state, address generator 5 is provided to generate a predetermined block address by means of an address counter, a read only memory, and an adder (not shown).

The digital audio signal and the parity data that have been read out from either RAM 3 or 4 are fed to adder 7, where they are added with a block address produced by block address generator 8. The combined output signals from adder 7 are fed to parallel-to-serial converter 9, with the resultant serialized signal fed to CRC encoder/decoder 10. In this example, the CRC encoder/decoder 10 has a generation polynomial given by $x^{16}+x^{12}+x^5+1$ and generates a CRC code of 16 bits that is added to each block. The operation of CRC encoder/decoder 10 is controlled by timing signals from CRC timing generator 11. Since frequency modulation (FM) is employed in the signals of this example, the output signal from CRC encoder/decoder 10 is fed to FM encoder/decoder 12, and the output signal from FM encoder/decoder 12 is fed to adder 13, in which it is added with a block synchronizing signal produced by synchronizing signal generator 14. The combined signal is fed to output terminal 15 to be recorded on magnetic tape using a known rotary magnetic head recording apparatus.

In the receiving or reproduction mode of the system of FIG. 8, a digital signal reproduced from a magnetic tape (not shown) is fed through input terminal 16 to synchronous detecting circuit 17, with the detected signal being fed to FM encoder/decoder 12 where the signal is FM demodulated. The FM demodulated signal is fed to the CRC encoder/decoder 10 where it is error checked by the CRC code at every block, with the result of the error checking being a one bit error pointer, which is memorized in pointer random access memories (RAMs) 18 and 19. Pointer RAMs 18 and 19 correspond to RAMs 3 and 4 and the error pointer is written at the respective address of their 1320 blocks ($10 \times 132 = 1320$), and the block addresses common to RAMs 3 and 4 are also supplied to pointer RAMs 18 and 19 from address generating circuit 5.

The reproduced and demodulated data signal is also supplied to buffer 20 whose buffered output signal is fed to serial-to-parallel converter 21, which places the parallel-arranged data in the proper form for writing into RAMs 3 and 4. Buffer 20 functions to delay the reproduced data until the error pointer, which is the result of the CRC error check conducted by CRC encoder/decoder 10, has been generated. In this reproductionn mode RAMs 3 and 4 operate in a similar fashion as in the recording mode discussed above, such that when the one memory field has the reproduced data written thereinto, errors in the reproduced data read out from the other RAM are corrected. Upon writing the reproduced data in either RAM 3 or 4, the error word indicated by the error pointer is not written. To accomplish this, the error pointer read out from pointer RAM 18 or 19 is fed to timing generator 22, which generates control signals fed to RAMs 3 and 4 to prevent writing the error words thereinto.

The reproduced data read out from RAMs 3 or 4 is supplied to P, Q encoder/decoder 6 to carry out error correction using known parity techniques and, once any errors in the data have been corrected, the data is again written back into RAMs 3 or 4. In the case of such error correction, all that is required is that the error word have sufficient information to show that the word is erroneous and, as described above, the error word itself is not written into RAMs 3 or 4. If more than two error words are contained in one parity generating series, then error correction is impossible, however, when error correction using parity series P and error correction using parity series Q are alternately and repetitively carried out, the number of words in which error correction is impossible is reduced substantially.

The reproduced data read out from RAMs 3 or 4, in which the errors have already been corrected, is supplied to amending circuit 23 that performs the mean-value-interpolating process on words having errors that cannot be corrected. The output of amending circuit 23 is fed to digital-to-analog converter 24, annd the analog output signal therefrom is fed through output terminal 25 as the reproduced audio signal.

FIG. 9 represents a code structure for use when the present invention is used to process an audio signal accompanied by a video signal in accordance with the CCIR system. In the case of the CCIR system, when the audio signal of one field is sampled at a sampling frequency of $2f_h$, then 1250 samples are obtained. In FIG. 9, the six bits of control data $ID_0$ to $ID_5$, similar to the above-described example, are added and a code structure of 1256 words is presented, where n times m is $8 \times 157 = 1256$. In this example, the interleave is carried out such that every two words of the digital data, including the control data, are arranged in the lateral (left to right) direction with an interval of 52 blocks. Since $m = 157$ blocks, an odd number, the remaining 1 block is allocated with one word, and each block alternately contains the left and right data of the stereophonic audio signal. The parity series P is formed of eight words taken from each data series, with a distance of 17 blocks, and the parity series Q is formed of nine words taken from each data series with a distance of 14 blocks, and the distance between the two parity series P and Q is 3 blocks. As in the above-described example, the parity series Q is positioned at the end of a block, and the parity series P is positioned at the center of a block.

Differing from the example of the invention described above, wherein $n = 8$, $m = 132$, and $k = 1$, if the parity series Q is located at the center of one block, as shown, for example, in FIG. 4, and the distance between two series of the parity series P and the parity series Q is in units of two blocks, that is, the difference is divisible by two, and has a code structure in which the distance $D = 13$ blocks, the burst error correcting capability will be substantially as shown in FIG. 10 by the curve formed of a broken line and open circles. Referring then to the graph of FIG. 10, in which the abscissa represents the mode of the decoder in which P and Q represent the error correcting operations of the ith order, by using the parities P and Q, and the ordinate axis represents the number of blocks of correctable burst error length. This number of blocks of the correctable burst error length can be increased by repeatedly carrying out the error correction operation, however, there is a maximum burst error length that is correctable, regardless of the number of iterations. Thus, in the situation where the separation distance $D = 13$ blocks, a maximum burst error of 22 blocks can be corrected, as represented by the levelling off of the curve formed of the broken line and circles.

In the example discussed hereinabove in which the distances were given by $D = 14$, 15 blocks, the error correcting capability is shown in FIG. 10 by the curve formed of the solid line and open rectangles, and this error correcting capability can correct a maximum burst error of 24 blocks. Similarly, in the case where the parity word Q is positioned at the end of a block, the parity word P is positioned at the center of the block, and the distance $D = 14$, the error correcting capability is shown in FIG. 10 by the curve formed of the single-dot chain line and open triangles, which indicates that the system can correct a maximum burst error length of 23 blocks.

Referring to the graph of FIG. 11, in which the abscissa again represents the mode of the decoder similar to that of FIG. 10 in which the parities P and Q represent the error correcting operations of the ith order, and the ordinate represents the number of error words which remain without being corrected. The present invention teaches that when burst errors of 22 blocks, 23 blocks, 24 blocks, and 25 blocks are present, as represented by the solid line curves of FIG. 11, by repeating the error correction operation using parities P and Q, the number of error words is gradually decreased, which means that the errors are corrected. In this example, since the correctable length is up to 24 blocks, the number of error words that remain to be corrected will ultimately become zero. Whereas, in the case of known error correcting structures where the distance D=13 blocks, represented by the curves formed of broken lines in FIG. 11, only 22 blocks can be taken to the zero state and burst errors longer than 22 blocks cannot be corrected.

Thus, as is apparent from the graphs forming FIGS. 10 and 11, according to one aspect of the present invention the error correcting capability can be improved over that provided by known error correcting systems. Additionally, the present invention provides the further advantage that the hardware implementation need not be complicated compared to known error correcting systems, and the parity data Q is not limited to a position at the upper end portion of a block but can be repositioned to the lower end portion of a block. Also, the adjacent code and the Reed-Solomon code can be used alone or combined with different other codes in accordance with the teaching of the present invention, and in the case of the use of such different other codes, a redundant code of more than two can be used.

Although illustrative embodiments of the invention have been described in detail herein with reference to the accompanying drawings, it is to be understood that the invention is not limited to those precise embodiments, and that various changes and modifications can be effected therein by one skilled in the art without departing from the spirit and scope of the invention, as defined in the appended claims.

What is claimed is:

1. Apparatus for providing an error correcting code for a digital data signal to be transmitted, said digital data signal being formed of a plurality of blocks, said apparatus comprising:
random access memory means into which said digital data signal is selectively written;
a parity code generator connected to said random access memory means receiving said digital data contained therein for generating two parity series therefrom forming error correction codes and for arranging a first parity series at the center of block and a second parity series at one end of the block, said digital data and parity series being fed back to said random access memory means;
address generator means for generating interleaving addresses and block addresses for use in reading out said digital data signal and parity series in an interleaved state, said interleaving addresses being fed to said random access memory means for reading out said digital data signal and said two parity series;
signal summing means connected to sum the digital data signal and parity series read out from said random access memory means in accordance with said interleaving addresses with said block addresses from said address generator means and producing a serial summed signal therefrom; and
modulation encoder means connected to modulate said serial summed signal from said signal summing means and producing a modulated digital data signal to be transmitted including an error correcting code.

2. Apparatus for providing an error correcting code for a digital signal according to claim 1, further comprising check code generator means connected to receive said serial summed signal from said signal summing means for generating therefrom a check code and producing an output signal formed of said check code word added to said serial summed signal and being fed to said modulation encoder means.

3. Apparatus for providing an error correcting code for a digital data signal according to claim 2, in which said check code generator means includes means for generating a polynomial given by $X^{16}+X^{12}+X^5+1$, said polynomial being used for generating said check code.

4. Apparatus for providing an error correcting code for digital data signals according to claim 1, in which said signal summing means includes a parallel-to-serial converter for producing said summed serial signal.

5. Apparatus for providing an error correcting code for a digital data signal according to claim 1, in which said modulation encoder means includes a frequency modulator.

6. Apparatus for providing an error correcting code for a digital data signal according to claim 1, further comprising synchronous generator means for producing a synchronous signal and means for combining said synchronous signal with the output signal of said modulation encoder means.

7. Apparatus for correcting errors in a received modulated digital data signal having a known error code correcting structure, said apparatus comprising:
modulation decoder means connected to said received digital data signal for producing a demodulated digital data signal therefrom;
means for checking said demodulated digital signal for errors and producing an error pointer signal upon detecting an error:
address generator means for generating addresses assigned to said demodulated digital data;
pointer memory means into which said error pointer signals are written at the respective addresses assigned by said address generator means;
timing generator means receiving error pointer signals read out from said pointer memory means for generating corresponding control signals;
random access memory means connected to receive said demodulated digital data signal at respective addresses therein assigned by said address generator means and connected to receive said control signals from said timing generator means for blocking said demodulated digital data signal containing errors detected by said means for checking from being written into said random access memory means at addresses indicated by said control signals;
parity series decoder means connected to receive digital data signals read out from said random access memory means for correcting certain errors in said demodulated digital data signals contained therein according to a predetermined parity scheme; and
amending circuit means connected to output signals from said parity series decoder means for correcting certain errors remaining therein according to a predetermined error correcting scheme different than said parity scheme.

8. Apparatus for correcting errors in a received modulated digital data signal according to claim 7, in which said means for checking comprises a check code decoder.

9. Apparatus for correcting errors in a received modulated digital data signal according to claim 7, in which said modulation decoder means includes synchronous detector means for synchronously detecting the reproduced signal.

10. Apparatus for correcting errors in a received modulated digital data signal according to claim 7, further comprising buffer means connected to buffer and time delay said demodulated digital data signal and feeding said delayed signal to said random access memory means for writing at said addresses determined by said address generator means.

11. Apparatus for correcting errors in a received modulated digital data signal according to claim 7, in which said amending circuit means includes means for performing the mean-value-interpolation error correcting scheme.

12. A method for performing error correction in recording/reproduction of a digital data signal formed of a plurality of words, comprising the steps of:
writing said digital data signal into random access memories so that the words thereof are in an interleaved relationship;
generating two parity series based upon said digital data signal for use in error correction;
adding the parity series to the digital data signal written in the random access memories to produce combined signals;
modulating the combined signals;
recording the modulated combined signals;
reproducing the recorded signals;
demodulating the reproduced signals;
detecting whether errors are present in the demodulated reproduced signals and producing an error pointer identifying any detected errors;
generating address control signals for controlling the writing of the reproduced signals into random access memories at predetermined addresses;
preventing writing into random access memories of data occurring at locations corresponding to detected errors;
correcting first ones of the detected errors using the generated parity codes and producing a parity code corrected signal; and
correcting second ones of the detected errors in the parity code corrected signal according to a different error correcting scheme and producing an amended output signal.

13. A method for performing correction according to claim 12, further comprising the step of generating an error check code and adding the generated check code to the combined signals to produce second combined signals to be modulated and recorded.

14. A method for performing error correction according to claim 13, in which said step of generating the error check code includes the step of generating a polynomial given by $X^{16}+X^{12}+X^5+1$.

15. A method for performing error correction according to claim 12, in which said step of adding the parity series includes the steps of adding one parity series to the center of a block of digital data signals and adding the other parity series to an end of a block of digital data signals.

16. A method for performing error correction according to claim 12, in which said step of modulating includes the step of frequency modulating the combined signals.

17. A method for performing error correction according to claim 12, in which said step of preventing writing of data into random access memories includes the step of delaying the digital data signal so that the error pointer and digital data signal arrive at the random access memory substantially simultaneously.

18. Apparatus for effecting error correction in the recording and reproduction of digital data signals, comprising:
random access memory means for writing in and reading out said digital data signals;
means for generating two parity series based upon said digital data signals;
address generator means for generating addresses whereby said two parity series are written into said random access memory means;
signal summing means connected to sum the digital data signal from said random access memory means and the parity series from said random access memory means and the random access memory addresses from said address generator means for producing a serial summed signal therefrom;
modulation means connected to modulate said serial summed signal from said signal summing means;
means for recording said modulated signal on a record medium;
means for reproducing modulated signals from a recorded medium;
demodulator means connected to said reproduced signal for producing a demodulated digital data signal therefrom;
means connected to said demodulated digital data signal for detecting errors therein and producing an error pointer signal upon detecting an error;
means for writing said demodulated digital data signal into said random access memory means;
means connected to receive said error pointer signals for producing blocking signals fed to said random access memory means for blocking portions of said digital data signal from being written into said random access memory means;
parity series decoder means connected to said random access memory means for performing error correction on said demodulated digital data signal read out from said random access memory means for correcting predetermined ones of the errors therein according to a predetermined parity scheme and producing a parity corrected output; and
amending circuit means connected to the parity corrected output of said parity series decoder means for correcting second predetermined ones of the errors remaining therein using a second error correcting scheme different than said parity scheme.

19. Apparatus for effecting error correction according to claim 18, further comprising check code encoder means generating a check code and connected to receive said serial summed signal for producing an output signal formed of said check code added to said serial summed signal and being fed to said modulation means to be modulated, and in which said means for detecting errors comprises a check code decoder.

20. Apparatus for effecting error correction according to claim 19, in which said check code encoder means includes means employing a polynomial, $X^{16}+X^{12}+X^5+1$, for generating said check code.

21. Apparatus for effecting error correction according to claim 18, in which said digital data signals are formed of a plurality of blocks and said signal summing means includes means for locating one of said two parity series at the center of each block and the other of said two parity series at an end of each block.

22. Apparatus for effecting error correction according to claim 18, in which said means connected to receive said error pointer signals for producing blocking signals includes said address generator means connected to said random access memory means.

23. Apparatus for effecting error correction according to claim 18, in which said amending circuit means includes means for performing mean-value-interpolation error correction.

* * * * *